May 27, 1952     L. C. H. JUY     2,598,557

VARIABLE-SPEED GEAR

Filed June 11, 1947

INVENTOR.

LUCIEN C. H. JUY

BY

Haseltine, Lake & Co.

AGENTS

Patented May 27, 1952

2,598,557

UNITED STATES PATENT OFFICE 2,598,557

VARIABLE-SPEED GEAR

Lucien Charles Hippolyte Juy, Dijon, France

Application June 11, 1947, Serial No. 753,999
In France March 22, 1944

Section 1, Public Law 690, August 8, 1946
Patent expires March 22, 1964

5 Claims. (Cl. 74—217)

Variable speed gears of the derailleur type existing at present are of two kinds, one being known as the "single turn" kind and the other as the "double turn" kind.

In the former of these two kinds of gears only a very limited spacing is possible between the pinion teeth, while very precise adjustment in the length of chain is necessary. If these conditions are not fulfilled the chain fails to wind accurately on the pinion teeth, which causes grinding, the chain cascading over the teeth.

The double turn kind of gear has the disadvantages of large whip of the chain such, for example, as when travelling over a cobbled road, reduced output due to the two rollers always being under tension, and the difficulties of disconnecting the rear wheel.

The present invention has for its object to obviate the foregoing disadvantages.

In order that the invention may be clearly understood and readily carried into effect the same will hereinafter be more fully described with reference to the accompanying drawings, in which.

Figure 1:
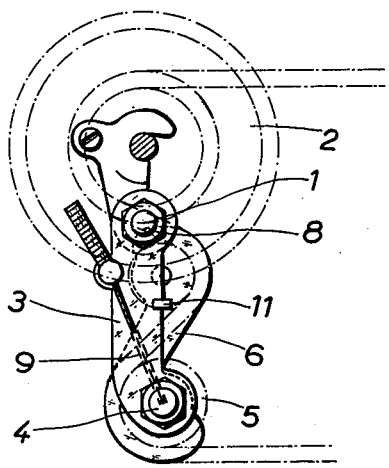
Figure 1 is a side view of a device according to the invention, as applied to a nest of two pinions, in the position where the chain engages with the smaller of the pinions.

Referring now to the drawings, a pivot pin 1 which is fixed with respect to the axis of the nest of pinions 2 (of which only two are shown) carries a tensioning arm 3. At its free end this tensioning arm supports the laterally reciprocating device 4 and a tensioning roller 5. On the axis of the reciprocating device 4 there is pivoted an arm 6 which supports a second or winding roller 7 adapted to oscillate in the forward direction. When the tensioning arm 3 rocks towards the rear under the influence of spring 11 in order to take up the slack in the chain when derailing on the small pinions, the arm 6 rocks forwardly under the influence of spring 10, this movement tensioning the chain and therefore reducing the amplitude of movement of the tensioning arm, as illustrated in Figure 1. At the same time this forward movement of the arm 6 increases the arc of contact of the chain with the small teeth of the engaged pinion to compensate for the reduced arc of contact resulting from the rearward movement of the roller 5. This ensures correct winding of the links, the arm 6 positioning the chain about the pinion in question by its contact with the winding roller 7.

Due to this correct positioning of the chain it is necessary to employ only a very weak tension spring, the chain becoming de-tensioned automatically. This permits of employing any control system for imparting a de-tensioning action on the chain without the latter cascading over the pinions.

For medium and large teeth, the tensioning arm 3 rocks forwardly and the arm 6 rearwardly, the roller 7 maintaining the chain exactly in mesh with the pinion in question.

In the arrangement shown the fixed point 1 with its pivot 8 provides for rocking of the tensioning arm 3. The arm 6 consists of two side plates between which the chain is laterally positioned and which support the winding roller 7. Any other form of arm, rollers with chain guards, pulleys and pinions may, however, be employed.

Figure 2:
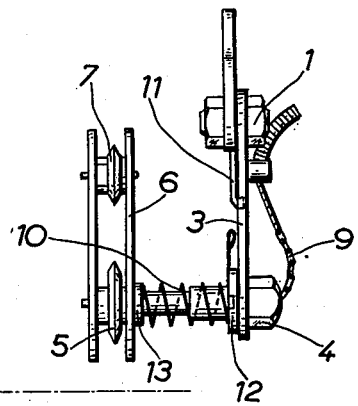
Figure 2 is a view of the device seen from the left of Figure 1.
Figure 3:
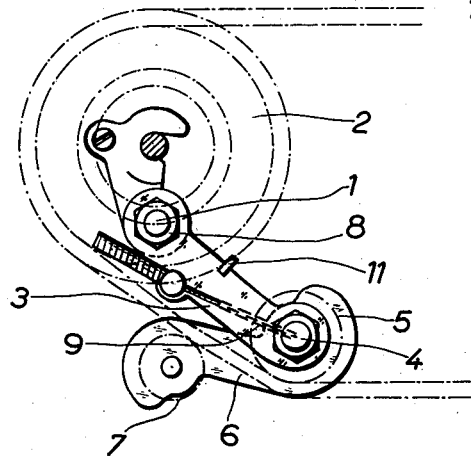
Figure 3 is a view similar to Figure 1 with the chain engaging the larger pinion.

The laterally reciprocating device shown in Figure 2 is actuated by a small chain 9 to which a cable and hand lever of any known kind are attached, spring 10 urging said member in the opposite direction. Here also, any other device for controlling the reciprocating member may be employed.

The tensioning roller 5 is urged to the rear by the tension spring 11.

The winding roller 7 is held under pressure in the forward direction by spring 10. This spring is attached at one end to the arm 6 by a centering cap 13 formed with an aperture or notch to receive the end of the spring, while the other end is engaged in one of the recesses in a locking collar or ring 12, the latter constituting a means for adjusting the reciprocating member and the centering cap for the spring 10, whereby the pressure of the spring may be regulated as desired. Alternatively a spring keyed in a fixed position may be employed, the pressure being determined by the construction of said spring.

I claim:

1. In a variable speed gear for bicycles and the like vehicles, the combination of a system of at least two coaxial pinions adapted to rotate in unison, a support on which said system is mounted, a driving chain operatively engaging selectively either of said pinions, a tensioning arm pivotally secured at its inner end to the support, a tensioning roller rotatably carried by the outer end of the tensioning arm and engaging the same side of the chain as the first mentioned pinions, a winding roller engaging the other side of the chain, an oscillatory arm to one end of which said winding roller is rotatably secured and the other end of which is pivotally secured to the outer end of the tensioning arm, means for shifting transversally said oscillatory arm to control the selective engagement of the driving chain with the pinions, and resilient means associated with each of said arms for urging the two arms, when the oscillatory arm is subjected to the action of the shifting means and has transferred the chain from one pinion to the other, to rotate in opposite directions for providing compensating movements in opposite directions of the chain engaging rollers.

2. In a variable speed gear for bicycles and the like vehicles, the combination of a system of at least two coaxial pinions adapted to rotate in unison, a support on which said system is mounted, a driving chain operatively engaging either of said pinions, a tensioning arm pivotally secured at its inner end to the support, a tensioning roller rotatably carried by the outer end of the tensioning arm and engaging the same side of the chain as the first mentioned pinions, a winding roller engaging the other side of the chain, an oscillatory arm to one end of which said winding roller is rotatably secured and the other end of which is pivotally secured to the outer end of the tensioning arm, means for shifting transversally said oscillatory arm to control the selective engagement of the driving chain with the pinions and a spring associated with each arm, said springs acting in opposition to said shifting means when the oscillatory arm is subjected to the action thereof, to constrain the two arms to rotate in opposite directions for providing compensating movements in opposite directions of the chain engaging rollers.

3. In a variable speed gear for bicycles and the like vehicles, the combination of a system of at least two coaxial pinions adapted to rotate in unison, a support on which said system is mounted, a driving chain operatively engaging either of said pinions, a tensioning arm pivotally secured at its inner end to the support, a roller rotatably carried by the outer end of the tensioning arm and engaging the same side of the chain as the first mentioned pinions, a winding roller engaging the other side of the chain, an oscillatory arm to one end of which said winding roller is rotatably secured and the other end of which is pivotally secured to the outer end of the tensioning arm, means for shifting transversally said oscillatory arm to control the selective engagement of the driving chain with the pinions, a spring associated with each arm, said springs acting in opposition to said shifting means and adapted, when the oscillatory arm is subjected to the action of the shifting means, to constrain the two arms to rotate in opposite directions for providing compensating movements in opposite directions of the chain engaging rollers and means for controlling the tension of the spring associated with said oscillatory arm.

4. In a variable speed gear for bicycles and the like vehicles, the combination of a system of at least two coaxial pinions adapted to rotate in unison, a support on which said system is mounted, a driving chain operatively engaging either of said pinions, a tensioning arm pivotally secured at its inner end to the support, a roller rotatably carried by the outer end of the tensioning arm and engaging the same side of the chain as the first mentioned pinions, a winding roller engaging the other side of the chain, an oscillatory arm to one end of which said winding roller is rotatably secured and the other end of which is pivotally secured to the outer end of the tensioning arm, means for shifting transversally said oscillatory arm to control the selective engagement of the driving chain with the pinions, a spring connected to each arm and acting in opposition with the shifting means when the oscillatory arm is subjected to the action of the shifting means, to constrain said arms to rotate in opposite directions for providing compensating movements in opposite directions of the chain engaging rollers, and a notched nut carried rigidly by one arm coaxially with the pivoting axis of the other arm with reference to said one arm and holding selectively the end of said spring connected with said one arm in one of its notches for adjustment of its tension.

5. In a variable speed gear for bicycles and the like vehicles, the combination of a system of at least two coaxial pinions adapted to rotate in unison, a support on which said system is mounted, a driving chain operatively engaging either of said pinions a tensioning arm pivotally secured at its inner end to the support, a roller rotatably carried by the outer end of the tensioning arm and engaging the same side of the chain as the first mentioned pinions, a winding roller engaging the other side of the chain, an oscillatory arm to one end of which said winding roller is rotatably secured and the other end of which is pivotally secured to the outer end of the tensioning arm, means for shifting transversally said oscillatory arm to control the selective engagement of the driving chain with the pinions, resilient means associated with each of said arms and adapted, when the oscillatory arm is subjected to the action of the shifting means, to constrain the two arms to rotate in opposite directions for providing compensating movements in opposite directions of the chain engaging rollers and manually adjustable means adapted to vary the constraint imposed by the resilient means on the oscillatory arm.

LUCIEN CHARLES HIPPOLYTE JUY.

REFERENCES CITED

The following references are of record in the file of this patent:

UNITED STATES PATENTS

| Number | Name | Date |
|---|---|---|
| 2,099,477 | Gruyer | Nov. 16, 1937 |

FOREIGN PATENTS

| Number | Country | Date |
|---|---|---|
| 382,104 | Great Britain | Oct. 20, 1932 |
| 411,360 | Great Britain | June 7, 1934 |
| 454,478 | Great Britain | Oct. 1, 1936 |
| 742,354 | France | Dec. 27, 1932 |